United States Patent
Andrzejak et al.

(10) Patent No.: US 7,426,570 B2
(45) Date of Patent: Sep. 16, 2008

(54) DETERMINING PLACEMENT OF DISTRIBUTED APPLICATION ONTO DISTRIBUTED RESOURCE INFRASTRUCTURE

(75) Inventors: Artur Andrzejak, Berlin (DE); Sven Graupner, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 880 days.

(21) Appl. No.: 10/627,324

(22) Filed: Jul. 25, 2003

(65) Prior Publication Data

US 2005/0021831 A1 Jan. 27, 2005

(51) Int. Cl.
*G06F 15/16* (2006.01)

(52) U.S. Cl. ............... 709/235; 709/223; 709/226; 709/230; 709/232

(58) Field of Classification Search ........... 709/235, 709/223, 226, 230, 232
See application file for complete search history.

(56) References Cited

U.S. PATENT DOCUMENTS

| | | | | |
|---|---|---|---|---|
| 5,511,167 A * | 4/1996 | Kawano et al. | ............ | 709/202 |
| 5,734,825 A * | 3/1998 | Lauck et al. | ............ | 709/233 |
| 5,878,224 A * | 3/1999 | Smith | ............ | 709/224 |
| 5,918,021 A * | 6/1999 | Aditya | ............ | 709/235 |
| 5,993,038 A * | 11/1999 | Sitbon et al. | ............ | 709/202 |
| 6,031,984 A | 2/2000 | Walser | | |
| 6,032,188 A * | 2/2000 | Mairs et al. | ............ | 709/234 |
| 6,052,712 A * | 4/2000 | Badovinatz et al. | ............ | 709/205 |
| 6,125,397 A * | 9/2000 | Yoshimura et al. | ............ | 709/235 |
| 6,125,400 A * | 9/2000 | Cohen et al. | ............ | 709/247 |
| 6,167,029 A * | 12/2000 | Ramakrishnan | ............ | 370/235 |
| 6,366,931 B1 * | 4/2002 | Borowsky et al. | ............ | 707/205 |
| 6,473,801 B1 * | 10/2002 | Basel | ............ | 709/226 |
| 6,507,844 B1 * | 1/2003 | Leymann et al. | ............ | 707/8 |
| 6,526,420 B2 | 2/2003 | Borowsky et al. | | |
| 6,574,669 B1 * | 6/2003 | Weaver | ............ | 709/239 |
| 6,782,527 B1 * | 8/2004 | Kouznetsov et al. | ............ | 717/103 |
| 6,834,310 B2 * | 12/2004 | Munger et al. | ............ | 709/232 |
| 6,928,482 B1 * | 8/2005 | Ben Nun et al. | ............ | 709/235 |
| 6,978,394 B1 * | 12/2005 | Charny et al. | ............ | 714/4 |
| 7,089,299 B2 * | 8/2006 | Chetuparambil et al. | ............ | 709/220 |

(Continued)

OTHER PUBLICATIONS

Sven Graupner, Vadim Kotov, Artur Andrsejak, Holger Trinks, Control Architecture for Service Grids in a Federation of Utility Data Centers, HP Labs Technical Report HPL-2002-235, Hewlett-Packard Company, Palo Alto, 2002. <http://www.hpl.hp.com/techreports/2002/HPL-2002-235.pdf>.

(Continued)

*Primary Examiner*—Bunjob Jaroenchonwanit
*Assistant Examiner*—Brian P Whipple

(57) ABSTRACT

A method of determining a placement of services of a distributed application onto nodes of a distributed resource infrastructure comprises first, second, and third steps. The first step forms communication constraints between node pairs. The communication constraints ensure that a sum of transport demands between a particular node pair does not exceed a transport capacity between the particular node pair. Each term of the sum comprises a product of a first placement variable, a second placement variable, and the transport demand between the services associated with the first and second placement variables. The second step forms an objective. The communication constraints and the objective comprise an integer program. The third step employs a local search solution to solve the integer program, which determines the placement of the services onto the nodes.

30 Claims, 5 Drawing Sheets

U.S. PATENT DOCUMENTS

2003/0005132 A1* 1/2003 Nguyen et al. .............. 709/229
2003/0055868 A1* 3/2003 Fletcher et al. ............. 709/201

OTHER PUBLICATIONS

Artur Andrzejak, Sven Graupner, Vadim Kotov, Holger Trinks, Algorithms for Self-Origanization and Adaptive Service Placement in Dynamic Distributed Systems, HP Labs Technical Report, HPL-2002-259, Hewlett-Packard Company, Palo Alto, Sep. 2002. <http://www.hpl.hp.com/techreports/2002/HPL-2002-259.pdf>.

Ciprianpo Santos, Xiaoyun Zhu, Harlan Crowder, A Mathematical Optimization Approach for Resource Allocation in Large Scale Data Centers, HP Labs Technical Report, HPL-2002-64R1, Hewlett-Packard Company, Palo Alto, 2002. <http://www.hpl.hp.com/techreports/2002/HPL-2002-64R1.pdf>.

Parameswaran Ramanathan, Suresh Chalasani, Resource Placement with Multiple Adjacency Constraints in K-ary n-Cubes, IEEE transactions on Parallel & Distributed Systems, May 1995, vol. 6, No. 5, pp. 511-519, IEEE Press, Los Alimitos, 1995.

Sven Graupner, Vadim Kotov, Holger Trinks, Resource-Sharing and Service Deployment in Virtual Data Centers, The 22nd International Conference on Distributed Computing Systems Workshops, Vienna Austria, Jul. 2-5, 2002, pp. 666-671, IEEE Computer Society, Los Alamitos, 2002.

Christodoulous A. Floudas, V. Visweswaran, Quadratic Optomization, Handbook of Global Optimization, pp. 217-269, Kluwer Academic Publishers, Boston, 1995.

Joachim P. Walser, Solving Linear Pseudo-Boolean Constraint Problems with Local Search, Proceedings of the Fourteenth National Conference on Artificial Intelligence and the Ninth Innovative Applications of Artificial Intelligence Conference, Jul. 27-31, 1997, Providence, Rhode Island, pp. 269-274, AAAI Press, Menlo Park, 1997.

Bart Selman, Hector Levesque, David Mitchell, A New Method for Solving Hard Satisfiability Problems, Proceedings of the Tenth National Conference on Artificial Intelligence Jul. 12-16, 1992, San Jose, California, pp. 440-446, AAAI Press, Menlo Park, 1992.

David Abramson, Henry Dang, Mohan Krishnamoorthy, A Comparison of Two Methods for Solving 0-1 Integer Programs Using a General Purpose Simulated Annealing Algorithim, Annals of Operations Research, v. 63, pp. 129-150, Baltzer Science, Amsterdam, Netherlands, 1996.

Joachim Paul Walser, Domain-Independent Local Search for Linear Integer Optomization, Dissertation, Progamming Systems Lab, Universitat de Saarlandes, Saarbrucken, Germany, Oct. 1998.

Bart Selman, Greedy Local Search in MIT Encyclopedia of the Cognitive Sciences, MIT Press, Cambridge, 1999.

Bart Selman, Henry A. Kautz, Bram Cohen, Local Search Strategies for Satifiabily Testing Presented at the Second DIMACS Challenge on Cliques, Coloring, and Satisfiability, Oct. 11-13, 1993 Piscataway, New Jersey.

Bart Selman, Henry A. Kautz, Bram Cohen, Noise Strategies for Improved Local Search, Proceedings of the Twelfth National Conference on Artificial Intelligence, Aug. 1-4, 1994, Seattle, Washington, pp. 337-343, AAAI Press, Menlo Park, 1994.

\* cited by examiner

DETERMINING PLACEMENT OF DISTRIBUTED APPLICATION ONTO DISTRIBUTED RESOURCE INFRASTRUCTURE

RELATED APPLICATIONS

The following applications disclose related subject matter: U.S. application Ser. No. 10/627,274, filed Jul. 25, 2003 and entitled, "Determination of One or More Variables to Receive Value Changes in Local Search Solution of Integer Programming Problem"; and U.S. application Ser. No. 10/627,883, filed Jul. 25, 2003 and entitled, "Incorporating Constraints and Preferences for Determining Placement of Distributed Application onto Distributed Resource Infrastructure"; the contents of all of which are hereby incorporated by reference.

FIELD OF THE INVENTION

The present invention relates to the field of placing a distributed application onto a distributed resource infrastructure. More particularly, the present invention relates to the field of placing a distributed application onto a distributed resource infrastructure where the distributed application and the distributed resource infrastructure have arbitrary communication topologies.

BACKGROUND OF THE INVENTION

A distributed application includes a plurality of services. Each of the services performs a task or tasks as part of the distributed application. Often the distributed application is placed on a network of computers. The network of computers forms a distributed resource infrastructure where each of the computers forms a node. Performance of the distributed application depends on optimizing a placement of the services onto the nodes.

A first method of the prior art uses parameters for individual nodes to determine a placement of the services onto the nodes. Such parameters include processing and storage capabilities of the nodes.

The first method does not consider relationships among the nodes or among the services in the determination of the placement of the services onto the nodes. A second method of the prior art considers topologies between the services and between the nodes but requires that the topologies be fixed in certain configurations. The second method does not determine a placement of the services onto the nodes where an arbitrary topology exists between the nodes or between the services.

What is needed is a method of determining a placement of services of a distributed application onto nodes of a distributed resource infrastructure taking into account arbitrary topologies between the nodes and between the services.

SUMMARY OF THE INVENTION

The present invention is a method of determining a placement of services of a distributed application onto nodes of a distributed resource infrastructure. In an embodiment of the present invention, the method comprises first, second, and third steps. The first step forms communication constraints between node pairs. The communication constraints ensure that a sum of transport demands between a particular node pair does not exceed a transport capacity between the particular node pair. Each term of the sum comprises a product of a first placement variable, a second placement variable, and the transport demand between the services associated with the first and second placement variables. The second step forms an objective. The communication constraints and the objective comprise an integer program. The third step employs a local search solution to solve the integer program, which determines the placement of the services onto the nodes.

These and other aspects of the present invention are described in more detail herein.

BRIEF DESCRIPTION OF THE DRAWINGS

The present invention is described with respect to particular exemplary embodiments thereof and reference is accordingly made to the drawings in which.

DETAILED DESCRIPTION OF A PREFERRED EMBODIMENT

The present invention determines a placement of a distributed application onto a distributed resource infrastructure. The distributed application comprises a plurality of services. The distributed resource infrastructure comprises a plurality of nodes.

Figure 1:
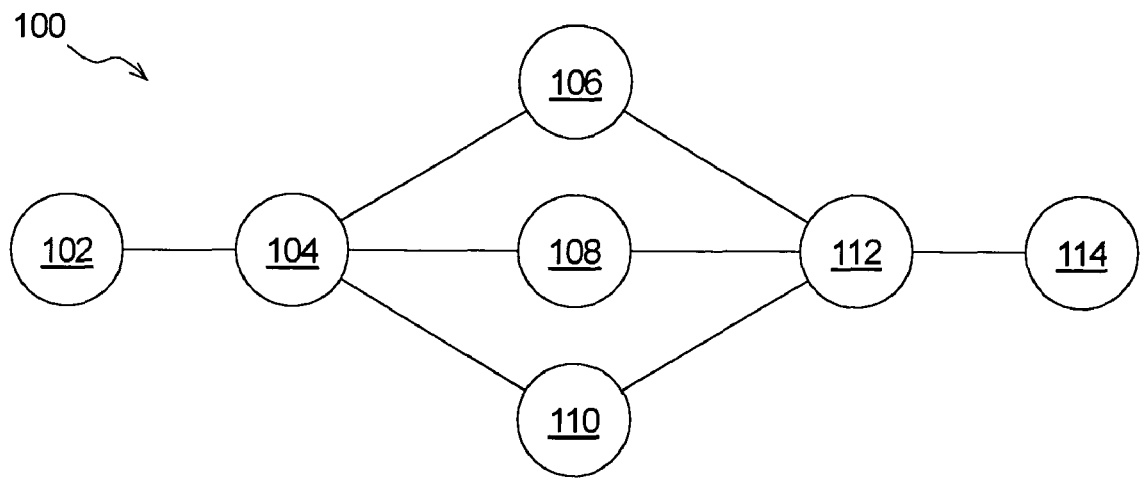
FIG. 1 schematically illustrates a distributed application according to an embodiment of the present invention.

A distributed application embodiment is illustrated schematically in FIG. 1. The distributed application embodiment 100 comprises a firewall 102, a local buffer 104, first, second, and third web servers, 106, 108, and 110, an application server 112, and a database 114, each of which forms a service. The firewall 102 is coupled to the local buffer 104. Each of the first, second, and third web servers, 106, 108, and 110, couples the local buffer 104 to the application server 112. The application server 112 is coupled to the database 114. In operation, the distributed application embodiment 100 provides web access to users who provide and obtain information from the database 114.

Figure 2:
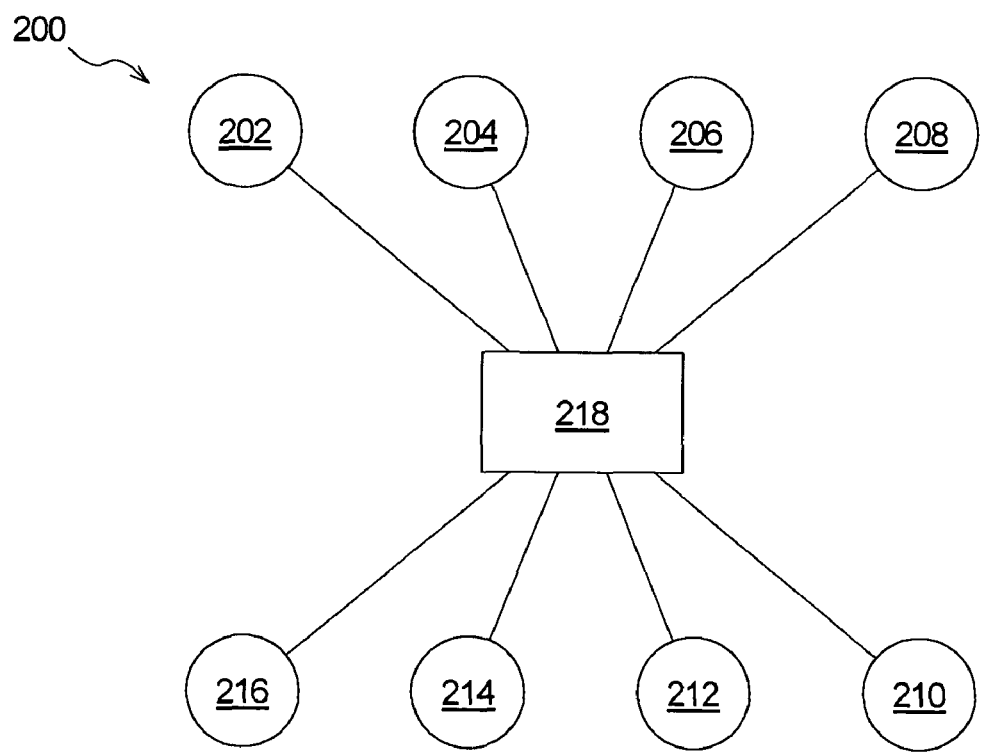
FIG. 2 schematically illustrates a distributed resource infrastructure according to an embodiment of the present invention.

A distributed resource infrastructure embodiment is illustrated schematically in FIG. 2. The distributed resource infrastructure embodiment 200 comprises first through eighth nodes, 202 ... 216, and a switch 218. The switch 218 couples each of the first through eighth nodes, 202 ... 216, to remaining nodes of the first through eighth nodes, 202 ... 216. The determination of the placement of the distributed application embodiment 100 onto the distributed resource infrastructure embodiment 200 is accomplished according to an objective such as minimizing network traffic, minimizing latency in order to reduce response time, or balancing a load on the nodes.

Figure 3:
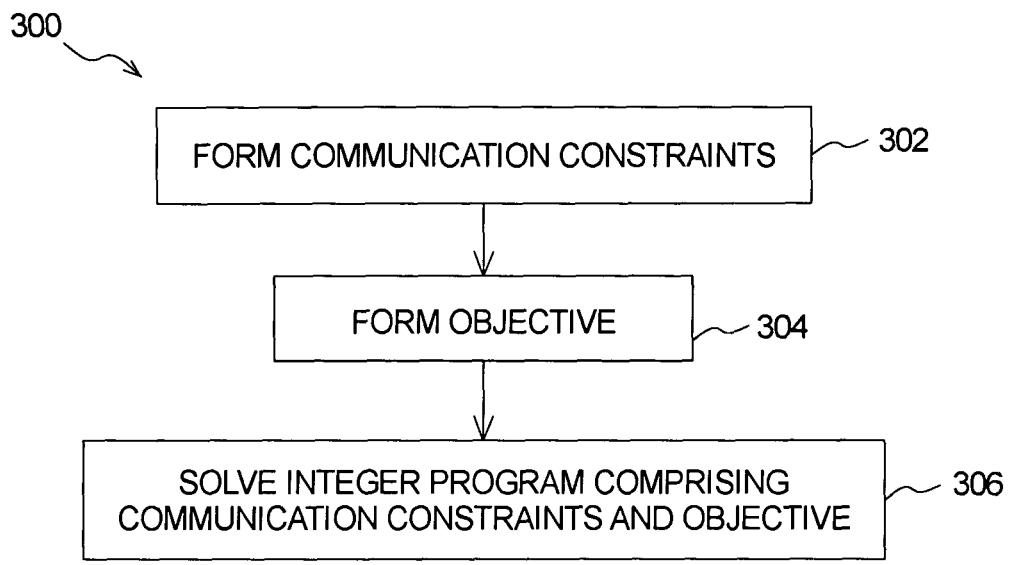
FIG. 3 illustrates a preferred method of determining a placement of a distributed application onto a distributed resource infrastructure as a block diagram according to an embodiment of the present invention.

A preferred method of the present invention is illustrated as a block diagram in FIG. 3. The preferred method 300 comprises first through third steps, 302 . . . 306. The first step 302 forms communication constraints, which ensure that transport demands between node pairs do not exceed transport capacities between the node pairs. Each of the communication constraints is made up of a sum of terms. Each of the terms comprises a product of a first placement variable, a second placement variable, and the transport demand between the services associated with the first and second placement variables. The second step 304 forms the objective. In the third step 306, a local search solution is employed to solve an integer program comprising the communication constraints and the objective, which provides the placement of the service onto the nodes.

Figure 4:
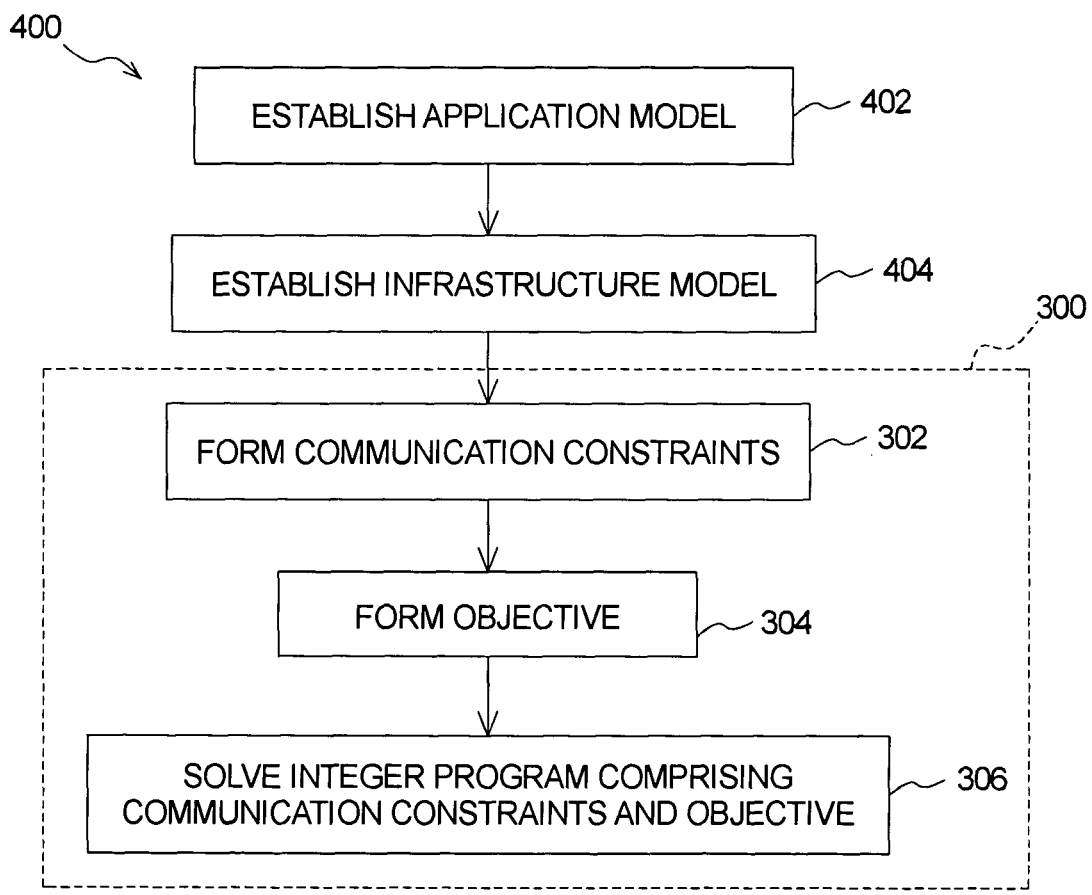
FIG. 4 illustrates a first alternative method of determining a placement of a distributed application onto a distributed resource infrastructure as a block diagram according to an embodiment of the present invention.

A first alternative method of the present invention is illustrated as a block diagram in FIG. 4. The first alternative method 400 adds fourth and fifth steps to the preferred method 300. The fourth step 402 establishes an application model, which comprise the transport demands between the services. The fifth step 404 establishes an infrastructure model, which comprises the transport capacities between the nodes. The application model and the infrastructure model provide the transport demands and capacities to the preferred method 300.

Figure 5:
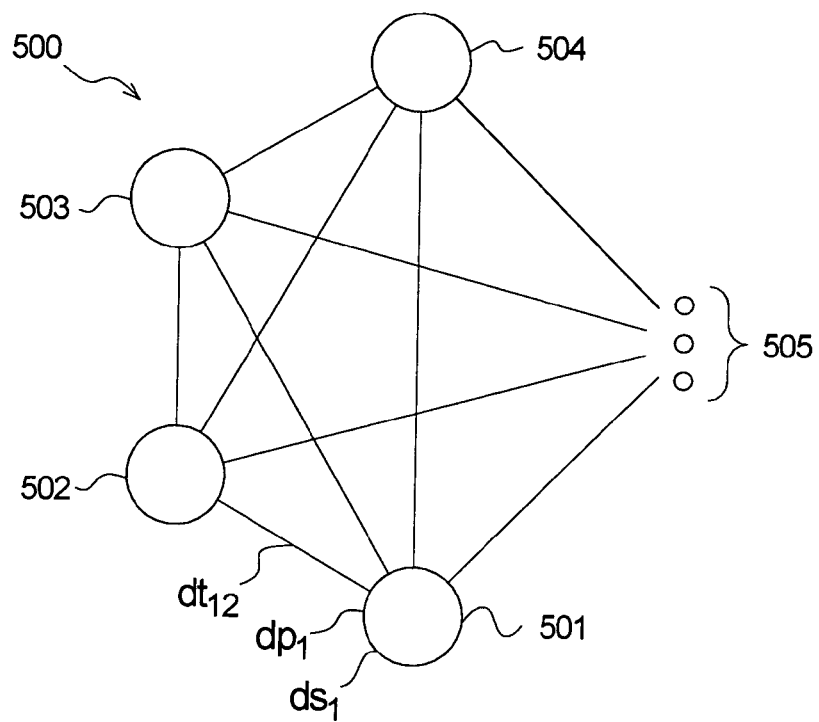
FIG. 5 schematically illustrates an alternative distributed application according to an embodiment of the present invention.

An alternative distributed application embodiment is illustrated schematically in FIG. 5. The alternative distributed application embodiment 500 comprises first through fourth services, 501 . . . 504, and fifth through Sth services, 505. Mathematically, the first through Sth services, 501 . . . 505, are expressed as $s \in \{1, 2, 3, \ldots, S\}$. Each pair of the services has an associated transport demand. For example, a first transport demand $dt_{12}$ represents communication traffic between the first and second services, 501 and 502. A transport demand matrix Dt lists the transport demands between the first through Sth services, 501 . . . 505, as follows.

$$Dt = \begin{pmatrix} - & dt_{12} & dt_{13} & \ldots & dt_{1S} \\ dt_{21} & - & dt_{23} & \ldots & dt_{2S} \\ dt_{31} & dt_{32} & - & \ldots & dt_{3S} \\ \ldots & \ldots & \ldots & - & \ldots \\ dt_{S1} & dt_{S3} & dt_{S3} & \ldots & - \end{pmatrix}$$

Since services do not communicate with themselves over a network, the transport demands along a matrix diagonal have no values. Further, depending upon a particular implementation it may be sufficient to characterize the transport demands without reference to direction in which case the transport demands below the matrix diagonal would also have no values.

Each of the first through Sth services, 501 . . . 505, of the alternative distributed application 500 is also characterized with a processing demand and a storage demand. For example, the first service 501 has a first processing demand $dp_1$ and a first storage demand $ds_1$. A processing demand vector Dp and a storage demand vector $D_s$ list the processing demands and the storage demands of the first through Sth servers, 501 . . . 505, as follows.

$$Dp = \begin{pmatrix} dp_1 \\ dp_2 \\ dp_3 \\ \ldots \\ dp_S \end{pmatrix} \quad Ds = \begin{pmatrix} ds_1 \\ ds_2 \\ ds_3 \\ \ldots \\ ds_S \end{pmatrix}$$

Figure 6:
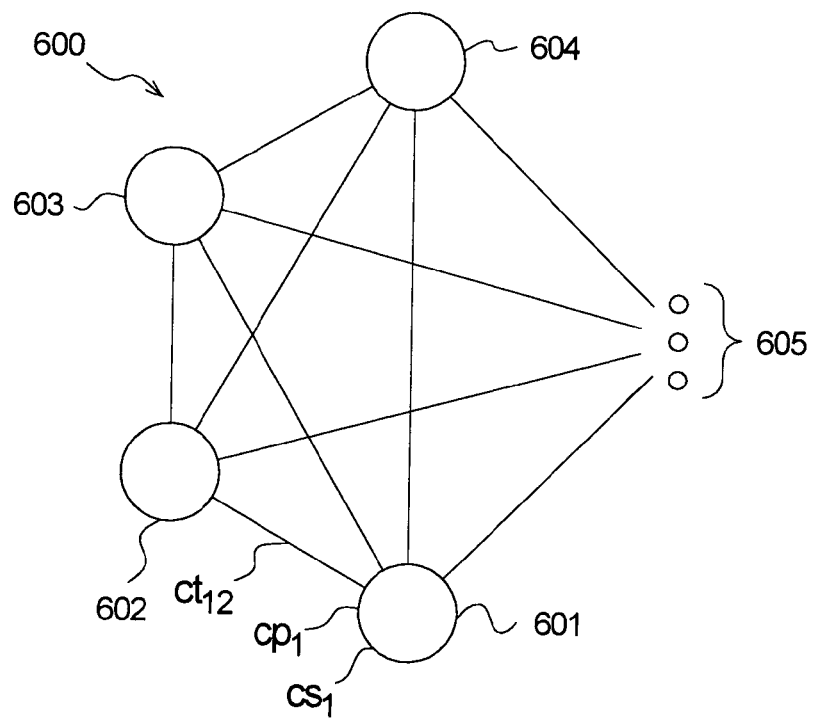
FIG. 6 schematically illustrates an alternative distributed resource infrastructure according to an embodiment of the present invention.

An alternative distributed resource infrastructure is illustrated schematically in FIG. 6. The alternative distributed resource infrastructure 600 comprises first through fourth nodes, 601 . . . 604, and fifth through Nth nodes, 605. Mathematically, the first through Nth nodes are expressed as $n \in \{1, 2, 3, \ldots, N\}$. Each pair of the nodes has an associated transport capacity. For example, a first transport capacity $ct_{12}$ represents communication bandwidth between the first and second nodes, 601 and 602. A transport capacity matrix Ct lists the transport capacities between the first through Nth nodes, 601 . . . 605, as follows:

$$Ct = \begin{pmatrix} - & ct_{12} & ct_{13} & \ldots & ct_{1N} \\ ct_{21} & - & ct_{23} & \ldots & ct_{2N} \\ ct_{31} & ct_{32} & - & \ldots & dt_{3N} \\ \ldots & \ldots & \ldots & - & \ldots \\ ct_{N1} & ct_{N3} & ct_{N3} & \ldots & - \end{pmatrix}$$

Since nodes do not communicate with themselves over a network, the transport capacities along a matrix diagonal have no values. Further, depending upon a particular implementation it may be sufficient to characterize the transport capacities without reference to direction in which case the transport capacities below the matrix diagonal would also have no values.

Each of the first through Nth nodes, 601 . . . 605, of the alternative distributed resource infrastructure 600 is also characterized with a processing capacity and a storage capacity. For example, the first node 601 has a first processing capacity $cp_1$ and a first storage capacity $cs_1$. A processing capacity vector Cp and a storage capacity vector Cs list the processing capacities and the storage capacities of the first through Nth nodes, 601 . . . 605, as follows.

$$Cp = \begin{pmatrix} cp_1 \\ cp_2 \\ cp_3 \\ \ldots \\ cp_N \end{pmatrix} \quad Ds = \begin{pmatrix} cs_1 \\ cs_2 \\ cs_3 \\ \ldots \\ cs_N \end{pmatrix}$$

In some situations, the distributed application under consideration operates solely on the distributed resource infrastructure. In this situation, the transport, processing, and storage capacities represent absolute capacities for the nodes. In other situations, the distributed application is one of a plurality of distributed applications operating on the distributed resource infrastructure. In these other situations, the transport, processing, and storage capacities represent available capacities for the nodes.

In the alternative distributed application embodiment 500 and the alternative distributed resource infrastructure embodiment 600, the transport and storage demands, Dt and Ds, as well as the transport and storage capacity, Ct and Cs, are normalized according to standard parameters of data per unit time and data, respectively. In an embodiment of the present invention, the processing demand Dp and the processing capacity Cp are normalized according to a processing criterion. Preferably, the processing criterion is a transaction speed especially when the distributed application forms a database application. Alternatively, the processing criterion is an algorithm speed. In another embodiment of the present invention, various processors are listed in a look-up table with associated processing capacities that have been normalized by the processing criterion. In this embodiment, a system implementing the present invention would go to the look-up table to find the processing capacity for a particular node when needed.

Applying the first alternative method 400 (FIG. 4) to the alternative distributed application model 500 and the alternative distributed resource infrastructure 600 begins with the fourth and fifth steps, 402 and 404, in which the transport demand and capacity matrices, Dt and Ct, are established. The first step 302 then forms the communication constraints in first and second tasks. The first task forms placement variables, which according to an embodiment of the present invention are Boolean variables. In a matrix notation, the placement variables are given by a placement variable matrix X where rows represent the services and columns represent the nodes. The placement variable matrix X is as follows.

$$X = \begin{pmatrix} x_{11} & x_{12} & \ldots & x_{1N} \\ x_{21} & x_{22} & \ldots & x_{2N} \\ \ldots & \ldots & \ldots & \ldots \\ x_{S1} & x_{S2} & \ldots & x_{SN} \end{pmatrix}$$

The second task forms the communication constraints according to a communication constraint equation, which is given as follows.

$$\sum_k \sum_i x_{ij} x_{kl} dt_{ik} = ct_{jl}$$

The second step 304 forms the objective, which according to an embodiment of the present invention minimizes communication traffic between the nodes and balances processing loads on the nodes. The latter is accomplished by minimizing the mathematical variance of the processing loads. The objective is given as follows.

$$\text{Minimize} (1-\alpha) \frac{1}{A} \sum_l \sum_j \text{Prox}_{lj} \sum_k \sum_i x_{ij} x_{kl} dt_{ik} +$$

$$\alpha \left\{ \sum_j \left( \frac{1}{cp_i} \sum_i x_{ij} dp_i \right)^2 - \frac{1}{N} \sum_l \left( \frac{1}{cp_i} \sum_k x_{kl} dp_k \right)^2 \right\}$$

for where α provides a relative weight between minimizing the communication traffic and balancing the processing loads, A provides a normalizing factor, $\text{Prox}_{lj}$ accounts for distances between the nodes, and N is a number of the nodes. The third step 306 then employs the local search solution to solve the integer program comprising the communication constraints and the objective.

Since the communication constraints account for a distributed application topology according to the transport demands and for a distributed resource infrastructure topology according to the transport capacities, the present invention allows arbitrary topologies for both the distributed application and the distributed resource infrastructure. This allows the present invention to be used for determining placement of applications onto infrastructures in wide variety of situations. Examples of such situations include placing an application onto nodes in a data center and placing a different application onto nodes in geographically distributed data centers.

A second alternative method of the present invention adds processing constraints to the integer program. The processing constraints ensure that a sum of the processing demands for a specific node does not exceed the processing capacity of the specific node. In an embodiment of the present invention, the processing constraints are formed according to a processing constraint equation, which is given as follows.

$$\sum_i x_{ij} dp_i \leq cp_j$$

A third alternative method of the present invention adds storage constraints to the integer program. The storage constraints ensure that a sum of the storage demands for a specific node does not exceed the storage capacity of the specific node. In an embodiment of the present invention, the storage constraints are formed according to a storage constraint equation, which is given as follows.

$$\sum_i x_{ij} ds_i \leq cs_j$$

A fourth alternative method of the present invention adds placement constraints to the integer program. The placement constraints ensure that each of the services is placed on one and only one of the nodes. In an embodiment of the present invention, the placement constraints are formed according to a placement constraint equation, which is given as follows.

$$\sum_j x_{ij} = 1$$

A fifth alternative method of the present invention recognizes that, once the services have been placed onto the nodes, a rearrangement of the services onto the nodes comes at a cost. In the fifth alternative method, reassignment penalties are assessed when a service placement differs from an existing assignment of the service. According to an embodiment of the fifth alternative method, a second objective is added to the integer program. The second objective seeks to minimize the reassignment penalties.

In the present invention, the communication constraints include terms which comprise products of two placement variables. Depending on the embodiment of the present invention, the objective also includes products of two placement variables. Thus, the communication constraints and possibly the objective are quadratic equations, i.e., equations having polynomial terms of second order. Solving integer programs that include polynomial terms of second or higher order is particularly difficult. In an embodiment of the present invention, a local search solution is employed according to a local search solution method disclosed in U.S. patent application Ser. No. 10/627,274 filed on Jul. 25, 2003, which is incorporated by reference in its entirety.

Figure 7:
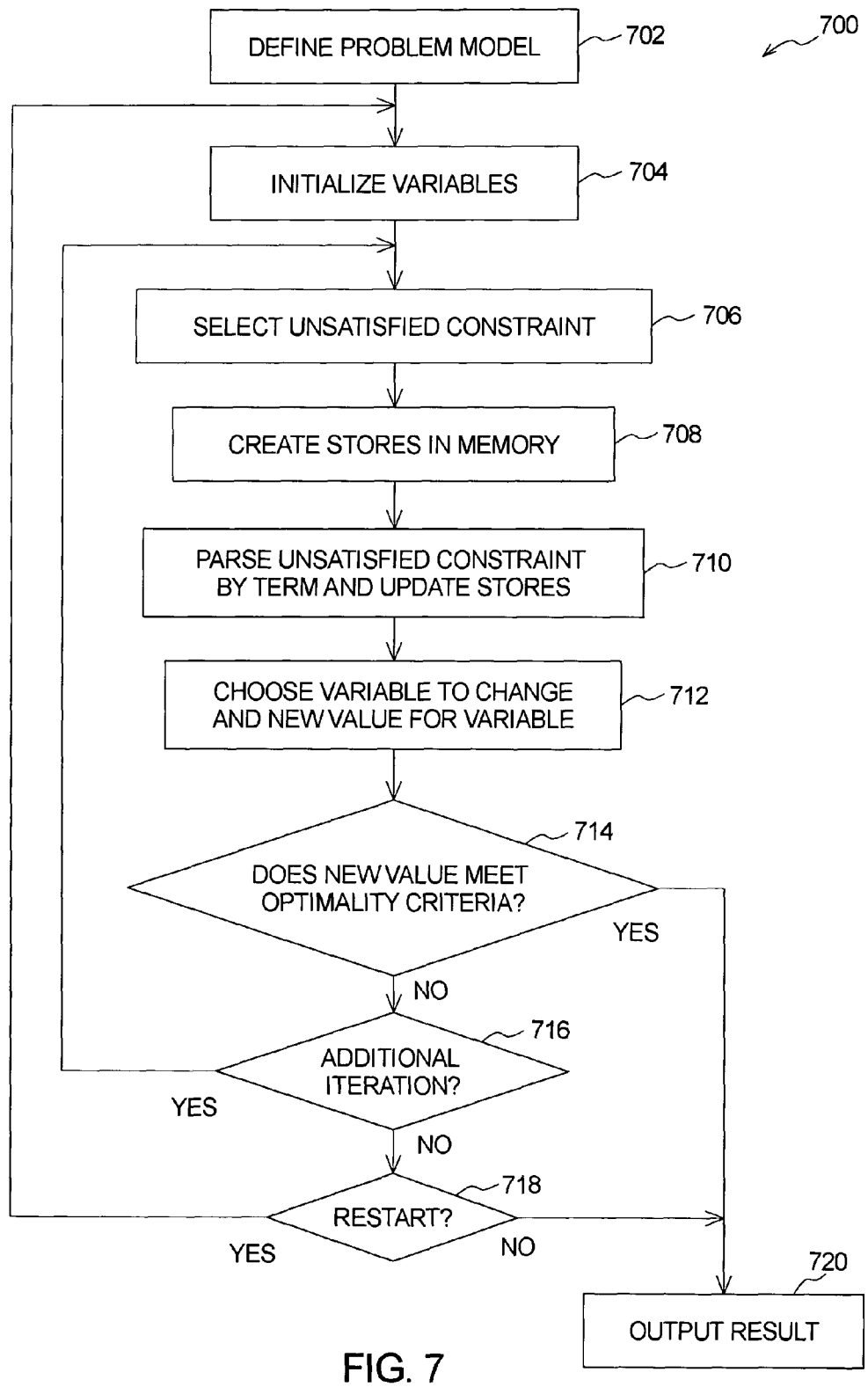
FIG. 7 illustrates a local search solution method as a flow chart according to an embodiment of the present invention.

An embodiment of the local search solution method is illustrated as a flow chart in FIG. 7. The local search solution method 700 comprises first through tenth solution steps, 702 . . . 720, in which a gradient following approach iteratively improves an initial assignment of values to the variables until a near optimum solution is reached. Each iteration of the local search solution produces a new assignment of values for the variables. The new assignment of values differs from a previous assignment of values by one value for a particular variable.

The first solution step 702 defines a problem model as an overconstrained integer programming problem. In an embodiment of the present invention, the problem model comprises data, variables, and constraints. The data comprises the processing demands and capacities, the storage demands and capacities, and the transport demands and capacities. The variables comprise the placement variables, which are Boolean variables where a zero value indicates that a particular service is not located on a particular node and where a one value indicates that the particular service is located on the particular node. In the overconstrained integer programming problem, the constraints comprise hard constraints and at least one soft constraint. The hard constraints comprise the processing constraints, the storage constraints, the placement constraints, and the storage constraints. The soft constraint is the objective, which comprises minimizing the communication traffic between the nodes and balancing the processing loads on the nodes.

In the second solution step 704, the placement variables are randomly initialized. The third solution step 706 selects an unsatisfied constraint. The fourth solution step 708 creates stores in memory for each of the placement variables in the unsatisfied constraint. The fifth solution step 710 parses the unsatisfied constraint by term. For each of the placement variables in the term, an associated store is updated with a change in the unsatisfied constraint due to flipping the value of the placement variable while holding other placement variables constant. In the sixth solution step 712, the placement variable that is to have its value flipped is chosen according to an improvement criterion, such as the placement variable which most improves the unsatisfied constraint or the placement variable which most improves an overall solution while also improving the unsatisfied constraint.

In the seventh solution step 714, assigned values are compared to optimality criteria to determine whether a solution has been found. The optimality criteria for the overconstrained integer programming problem are no violation of the hard constraints and a near optimum solution for the soft constraint. If the optimality criteria are not met, the local search solution method 700 continues in the eighth solution step 716 with a determination of whether an additional iteration is to be performed. If so, the local search solution method 700 returns to the third solution step 706 of selecting another unsatisfied constraint to determine another placement variable which is to have its value flipped. If not, a ninth solution step 718 determines whether to restart the local search solution method 700 by reinitializing the variables. If the optimality criteria are met in the seventh solution step 714, a final value assignment for the placement variables is output as a result in the tenth solution step 720. If the ninth step 210 determines to not restart the first alternative method 200, a "no solution found" message is output in the tenth solution step 720.

Preferably, the local search solution method is implemented using AMPL, a modeling language for optimization problems. Alternatively, the local search solution method 700 is implemented using an alternative modeling language.

Figure 8:
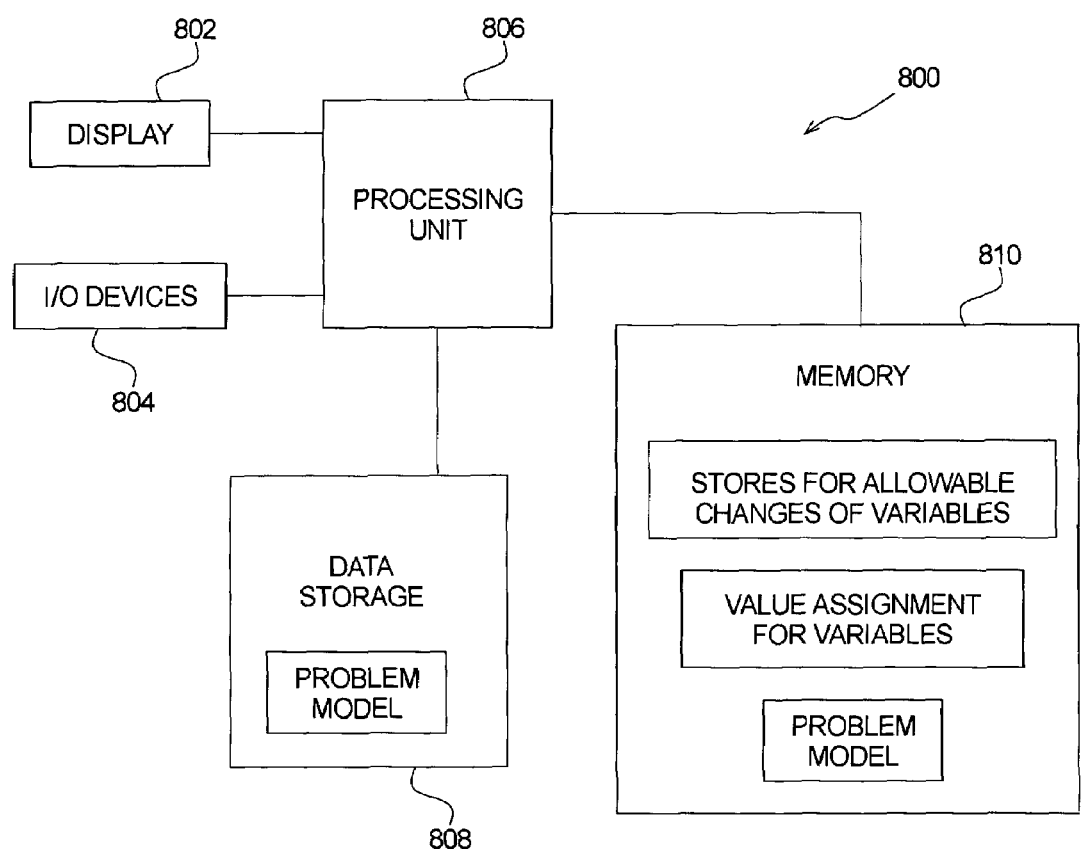
FIG. 8 illustrates a system for determining a placement of a distributed application onto a distributed resource infrastructure according to an embodiment of the present invention.

An embodiment of a system for solving an integer program of the present invention is illustrated schematically in FIG. 8. The system 800 includes a display 802, input/output devices 804, a processing unit 806, a storage device 808, and a memory 810. The processing unit 806 couples to the display 802, the input/output devices 804, the storage device 808, and the memory 810.

Employing the system 800 to solve the integer program according to the local search solution method 700 begins with the processing unit 806 reading the problem model into the memory 810. The processing unit 806 then initializes the variables by randomly assigning values to the variables. Next, the processing unit 806 randomly selects the unsatisfied constraint. Following this, the processing unit 806 creates stores in the memory 810 for the allowable changes of the variables in the unsatisfied constraint. The processing unit 806 then parses the unsatisfied constraint by term updating individual stores associated with the term while maintaining other variables constant. Following this, the processing unit 806 chooses the placement variable to have its value flipped according to the improvement criterion. The processing unit 806 then determines whether the optimality condition has been met and, if not, determines whether to perform more iterations or whether the local search solution method 700 should be restarted.

In an embodiment of the present invention, computer code resides on a computer readable memory, which is read into the system 800 by one of the input/output devices 804. Alternatively, the computer readable memory comprises the storage device 808 or the memory 810. The computer code provides instructions for the processing unit 806 to form the problem model and to solve it according to an embodiment of the present invention. The computer readable memory is selected from a group including a disk, a tape, a memory chip, or other computer readable memory.

The foregoing detailed description of the present invention is provided for the purposes of illustration and is not intended to be exhaustive or to limit the invention to the embodiments disclosed. Accordingly, the scope of the present invention is defined by the appended claims.

What is claimed is:

1. A method of determining a placement of services of a distributed application onto nodes of a distributed resource infrastructure comprising the steps of:

establishing an application model of the services comprising transport demands between the services;

establishing an infrastructure model of the nodes comprising transport capacities between the nodes;

forming an integer program that comprises:

a set of placement variables for a combination of the services and the nodes, each of the placement variables indicating whether a particular service is located on a particular node;

communication constraints between node pairs which ensure that a sum of the transport demands between a particular node pair does not exceed the transport capacity between to particular node pair, each term of the sum comprising a product of a first placement variable, a second placement variable, and the transport demand between the services associated with the first and second placement variables; and an objective; and employing a local search solution to solve the integer program which determines the placement of the services onto the nodes, wherein the services are assigned to the nodes according to a previous assignment and further comprising assessing reassignment penalties for placements of the services that differ from the previous assignments.

2. The method of claim 1 wherein the objective comprises minimizing communication traffic between the nodes.

3. The method of claim 1 wherein the application model further comprises processing demands for the services.

4. The method of claim 3 wherein the infrastructure model further comprises processing capacities for the nodes.

5. The method of claim 4 wherein the integer program further comprises processing constraints which ensure that a sum of the processing demands for each of the nodes does not exceed the processing capacity for the node.

6. The method of claim 5 wherein the objective comprises minimizing communication traffic between the nodes and balancing the processing demands on the nodes.

7. The method of claim 4 wherein the processing demands and the processing capacities are normalized according to a processing criterion.

8. The method of claim 7 wherein the processing criterion comprises an algorithm speed.

9. The method of claim 7 wherein the processing criterion comprises a transaction speed.

10. The method of claim 7 wherein the processing capacities of the nodes are found according to a look-up table in which different types of nodes have been normalized according to the processing criterion.

11. The method of claim 1 wherein the application model further comprises storage demands for the services.

12. The method of claim 11 wherein the infrastructure model further comprises storage capacities for the nodes.

13. The method of claim 12 wherein the integer program further comprises storage constraints which ensure that a sum of the storage demands for each of the nodes does not exceed the storage capacity for the node.

14. The method of claim 1 wherein the integer program further comprises placement constraints which ensure that each of the services is placed on one and only one of the nodes.

15. The method of claim 1 wherein the integer program further comprises a second objective that seeks to minimize the reassignment penalties.

16. A computer readable memory comprising computer code for directing a computer to make a determination of a placement of services of a distributed application onto nodes of a distributed resource infrastructure, the determination of the placement of the services onto the nodes comprising the steps of:
establishing an application model of the services comprising transport demands between the services;
establishing an infrastructure model of the nodes comprising transport capacities between the nodes;
forming an integer program that comprises:
a set of placement variables for a combination of the services and the nodes, each of the placement variables indicating whether a particular service is located on a particular node;
communication constraints between node pairs which ensure that a sum of the transport demands between a particular node pair does not exceed the transport capacity between the particular node pair, each term of the sum comprising a product of a first placement variable, a second placement variable, and the transport demand between the services associated with the first and second placement variables; and
an objective; and
employing a local search solution to solve the integer program which determines the placement of the services onto the nodes, wherein the services are assigned to the nodes according to a previous assignment and further comprising assessing reassignment penalties for placements of the services that differ from the previous assignments.

17. The computer readable memory of claim 16 wherein the objective comprises minimizing communication traffic between the nodes.

18. The computer readable memory of claim 16 wherein the application model further comprises processing demands for the services.

19. The computer readable memory of claim 18 wherein the infrastructure model further comprises processing capacities for the nodes.

20. The computer readable memory of claim 19 wherein the integer program further comprises processing constraints ensure that a sum of the processing demands for each of the nodes does not exceed the processing capacity for the node.

21. The computer readable memory of claim 20 wherein the objective comprises balancing the processing demands on the nodes.

22. The computer readable memory of claim 19 wherein the processing demands and the processing capacities are normalized according to a processing criterion.

23. The computer readable memory of claim 22 wherein the processing criterion comprises an algorithm speed.

24. The computer readable memory of claim 22 wherein the processing criterion comprises a transaction speed.

25. The computer readable memory of claim 22 wherein the processing capacities of the nodes are found according to a look-up table in which different types of nodes have been normalized according to the processing criterion.

26. The computer readable memory of claim 16 wherein the application model further comprises storage demands for the services.

27. The computer readable memory of claim 26 wherein the infrastructure model further comprises storage capacities for the nodes.

28. The computer readable memory of claim 27 wherein the integer program further comprises storage constraints which ensure that a sum of the storage demands for each of the nodes does not exceed the storage capacity for the node.

29. The computer readable memory of claim 16 wherein the integer program further comprises placement constraints which ensure that each of the services is placed on one end only one of the nodes.

30. The computer readable memory of claim 16 wherein the integer program further comprises a second objective that seeks to minimize the reassignment penalties.

* * * * *

UNITED STATES PATENT AND TRADEMARK OFFICE
CERTIFICATE OF CORRECTION

PATENT NO. : 7,426,570 B2
APPLICATION NO. : 10/627324
DATED : September 16, 2008
INVENTOR(S) : Artur Andrzejak et al.

It is certified that error appears in the above-identified patent and that said Letters Patent is hereby corrected as shown below:

In column 4, line 25, delete "$dt_{3N}$" and insert -- $ct_{3N}$ --, therefor.

In column 4, line 50, delete "Ds" and insert -- Cs --, therefor.

In column 5, line 63, delete "$Proxy_{1j}$" and insert -- $Prox_{ij}$ --, therefor.

In column 8, line 62, in Claim 1, delete "to" and insert -- the --, therefor.

In column 10, line 56, in Claim 29, delete "end" and insert -- and --, therefor.

Signed and Sealed this

Twenty-first Day of July, 2009

JOHN DOLL
*Acting Director of the United States Patent and Trademark Office*